S. C. KATZINGER.
DOUGH CUTTER.
APPLICATION FILED JUNE 18, 1915.
1,253,836.
Patented Jan. 15, 1918.
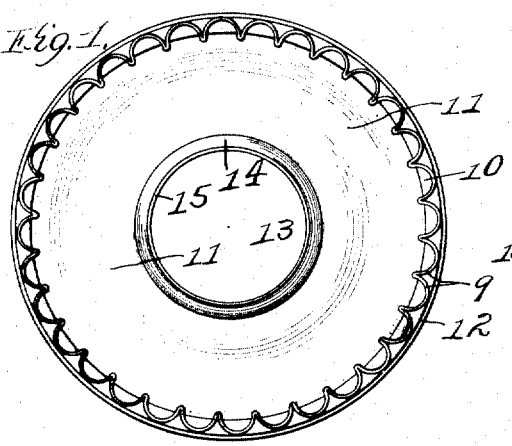
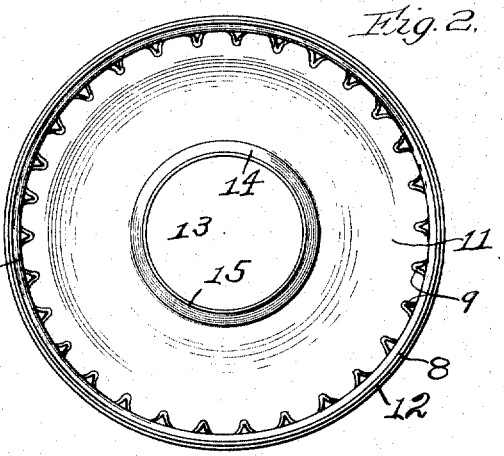
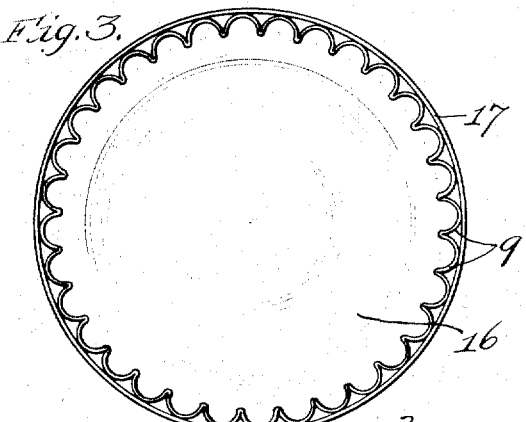
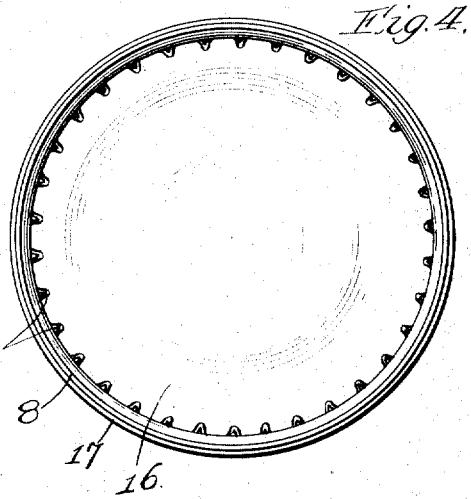
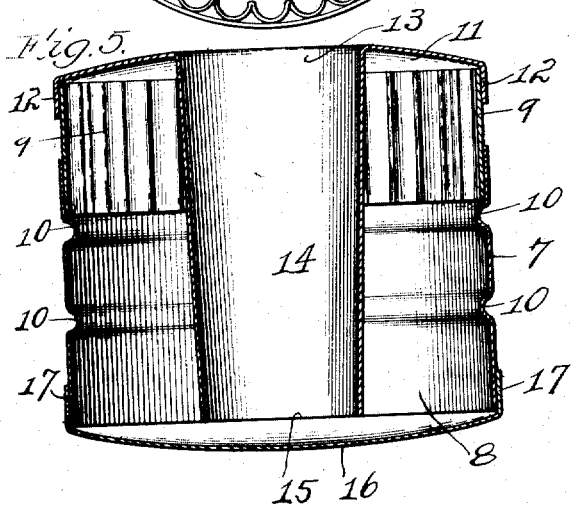
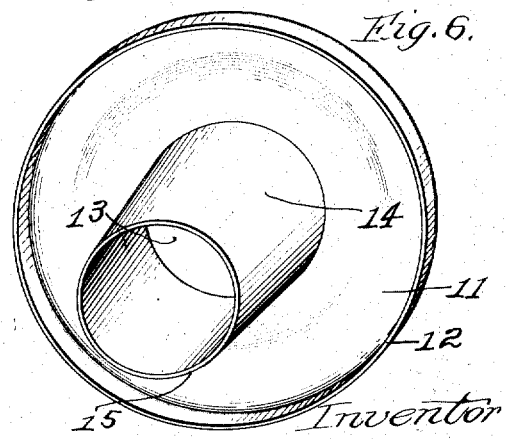
Inventor
Sidney C. Katzinger,

UNITED STATES PATENT OFFICE.

SIDNEY C. KATZINGER, OF CHICAGO, ILLINOIS, ASSIGNOR TO EDWARD KATZINGER CO., OF CHICAGO, ILLINOIS, A CORPORATION OF ILLINOIS.

DOUGH-CUTTER.

1,253,836.  Specification of Letters Patent.  Patented Jan. 15, 1918.

Application filed June 18, 1915. Serial No. 34,771.

*To all whom it may concern:*

Be it known that I, SIDNEY C. KATZINGER, a citizen of the United States, residing at Chicago, in the county of Cook and State of Illinois, have invented certain new and useful Improvements in Dough-Cutters, of which the following is a specification.

My invention relates to cutters for biscuits, cakes, macaroons, dough-nuts, and the like, and has for its object the provision of a device of the character mentioned, which is simple of construction, efficient in use, and inexpensive to manufacture. Other objects will appear hereinafter.

An exemplification of my invention is shown in the accompanying drawing forming a part of this specification and in which—

Figures 1, 2, 3, and 4 are end views of the cutter arranged for cutting different shapes.

Fig. 5 is a longitudinal section of the device in closed condition; and

Fig. 6 is a view, in perspective, of one of the covers and the small cutter attached thereto.

The device comprises a substantially tubular body 7, having one of its ends 8 cylindrical and its other end 9 of a form to cut a scalloped cake, or the like. I have shown these ends 8 and 9 as just described, but it is understood that these ends may be changed to cut other shaped cakes and the like when so desired. I preferably provide beads 10 formed in the body to stiffen the same, and also to add to the general appearance of the device. The corrugated part 9 which is adapted to cut the scalloped cakes, and the like, may be made of a separate piece of metal or other suitable substance and secured to the cylindrical portion by means of solder or other securing means. When corrugated part 9 is made of a separate piece, it preferably extends into the body 7 and rests against the first bead 10. However, when so desired, the entire body 7, including both ends, may be made of one piece of metal and given the desired form.

I provide a cap 11 having a flange 12 adapted to fit over either end 9 or 8 of the body and of a size to frictionally lock the cap in position on the body when the cap is applied to either end thereof. The cap 11 is perforated as at 13 at its central part, and depending from the edges of the perforation 13 is a tubular member 14 having its lower end 15 adapted to cut the dough in forming certain kinds of cakes and the like. The member 14 is preferably tapered from its end at perforation 13 to its end 15, so that dough cut at end 15 will become loose as it is pressed upwardly in the opening of the tube, to prevent packing the dough which enters said opening. With this construction it will be seen that as soon as two or three pieces of dough have entered the opening of member 14, a slight blow on one edge of cap 11 when the latter is inverted, will readily remove the dough portions in the tube. The portion of the dough on the outside of tube 14 and in the body portion is of such size that the dough does not remain in the body or else if it does, a slight blow on the edge of the body will cause the dough to be discharged therefrom.

In Fig. 1 I have shown the device having cap 11 on the end 8 of the body and adapted to use the ends 9 and 15 for cutting cakes, dough-nuts, or the like, with scalloped outer peripheries. The arrangement of the parts shown in Fig. 2 is the same as that shown in Fig. 5 except that the cap 16 at the bottom of the latter view is removed. This arrangement provides means for cutting out a circular cake, or the like, with a circular opening at its center and utilizes ends 8 and 15 to do the cutting.

In Fig. 3, the body 7 and the cap 16 are used and end 9 of the body 7 is used to cut a cake, or the like, with a scalloped periphery. When using the device as in Fig. 3, the central part of the cake is not cut away, thus leaving a disk shaped cake, or the like, with no perforations therein. In Fig. 4 the body 7 is reversed with respect to cover 16, to the position shown in Fig. 3, and the device is arranged to cut a disk shaped cake, or the like, without perforations therein. When in this latter form, end 8 of the body 7 is utilized as a cutter.

When it is desired to cut small disks such as macaroons or other small cakes, and the like, the cap 11 is used for a handle or holder and the cutting end 15 of tube 14, is used as the cutter.

The cap 16 is provided with a flange 17 similar in size and shape to the flange 12 on cap 11, so that it will frictionally engage either end 8 or 9 of body 7 to hold the cap 16 in position. The caps 11 and 16 are both preferably slightly dished in order to give them strength and afford a convenient surface for the engagement of the hand of the operator.

It will be seen from the above that five distinct shapes of cakes, and the like, may be cut by arranging the parts of this device in the manner already mentioned. The cutting ends 8, 9 and 15 are not shown as being sharpened since this device is made of thin metal, but when so desired the device may be made of heavier metal and sharpened at its cutting edges.

While I have illustrated and described the preferred form of construction of my invention, I do not desire to be limited to the precise details set forth, but desire to avail myself of such variations and changes as come within the scope of the appended claims.

What I claim is:

1. A dough cutter comprising a tubular member having each of its ends of a different configuration than the other end and both ends being cutter ends; a cap adapted to fit both of said cutter ends, one at a time; and a cutter on the cap adapted to extend through the tubular member and coöperate with each of said cutter ends, one at a time.

2. A dough cutter comprising a tubular member with inwardly disposed circumferential beads struck up therein, one of its ends being a cutter end; an annular member corrugated longitudinally with one of its ends extending into said tubular member against one of said beads with its other end forming a cutter end; a cap adapted to fit on the tubular member and the corrugated annular member, one at a time; and a cutter on the cap adapted to extend through the tubular member and the annular corrugated member coöperating with said cutter ends, one at a time.

In testimony whereof I have signed my name to this specification, in the presence of two subscribing witnesses, on this 16th day of June A. D. 1915.

SIDNEY C. KATZINGER.

Witnesses:
EDWARD KATZINGER,
THOMAS COLSON.